US008674553B2

(12) United States Patent
Pu et al.

(10) Patent No.: US 8,674,553 B2
(45) Date of Patent: Mar. 18, 2014

(54) ELECTROMAGNETIC TRANSMISSION APPARATUS

(75) Inventors: Ta Chun Pu, Kaohsiung (TW); Chun Yih Wu, Taipei (TW); Hung Hsuan Lin, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 427 days.

(21) Appl. No.: 13/084,803

(22) Filed: Apr. 12, 2011

(65) Prior Publication Data
US 2012/0043824 A1 Feb. 23, 2012

(30) Foreign Application Priority Data

Aug. 19, 2010 (TW) ................................ 99127688 A

(51) Int. Cl.
*H01F 27/42* (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| | | | |
|---|---|---|---|
| 6,529,174 B2 | 3/2003 | Stjernman et al. | |
| 6,656,788 B2 | 2/2005 | Chang et al. | |
| 6,882,239 B2 | 4/2005 | Miller | |
| 6,956,450 B1 | 10/2005 | Lohr | |
| 6,960,968 B2 | 11/2005 | Odendaal et al. | |
| 7,272,367 B2 | 9/2007 | Amano | |
| 7,515,021 B2 | 4/2009 | Kalinin et al. | |
| 7,570,134 B2 | 8/2009 | Koji | |
| 2005/0088258 A1 | 4/2005 | Fischer | |
| 2009/0278537 A1 | 11/2009 | Harvey | |
| 2011/0121830 A1* | 5/2011 | Ma et al. | ........................ 324/318 |

FOREIGN PATENT DOCUMENTS

CN 1243608 A 2/2000
CN 1301524 A 7/2001

OTHER PUBLICATIONS

Aristeidis Karalis et al., "Efficient wireless non-radiative mid-range energy transfer," Science Direct, Annals of Physics 323 (2008) 34-48.
D R. Smith et al., "Composite Medium with Simultaneously Negative Permeability and Permittivity," Physical Review Letters, The American Physical Society, May 1, 2000, p. 4184-4187, vol. 84, No. 18.
R.R.A. Syms E. Shamonina and L Solymar, "Magneto-inductive waveguide devices," IEE Proc.—Microw. Antennas Propag., Apr. 2006, p. 111-121, vol. 153, No. 2.
Office Action issued by State Intellectual Property Office of the People's Republic of China on Sep. 2, 2013.
Office Action issued by Taiwan Intellectual Property Office of the R.O.C on Dec. 26, 2013.

(Continued)

*Primary Examiner* — Robert L. Deberadinis
(74) *Attorney, Agent, or Firm* — Egbert Law Offices, PLLC

(57) ABSTRACT

An electromagnetic transmission apparatus comprises a plurality of electromagnetic coupling elements, wherein each electromagnetic coupling element has at least one resonant structure. The plurality of electromagnetic coupling elements are arranged that when the electromagnetic transmission apparatus is operated within a specific frequency band, an electromagnetic coupling device near the electromagnetic transmission apparatus within an electromagnetic distance can electromagnetically couple with the electromagnetic transmission apparatus by near-field coupling, and the electromagnetic wave of the electromagnetically coupling propagates along with the arrangement direction of the plurality of electromagnetic coupling elements.

27 Claims, 11 Drawing Sheets

(56) References Cited

OTHER PUBLICATIONS

A Griol, J. Marti and L. Sempere, Microstrip multistage coupled ring bandpass filters using spur-line filters and harmonic suppression, Apr. 26, 2001, vol. 37, No. 9, pp. 572-573.

A.A. Aleksandrovsky et al., Selective properties of microstrip filters based on hairpin resonators with stub elements, Microwave Electroncis: Measurements, Identification, Application Conference, 2001. MEMIA 2001 Digital Object Identifier: 10.1109/Memia.2001.982326 Publication Year: 2001, pp. 82-85.

* cited by examiner

ELECTROMAGNETIC TRANSMISSION APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to an electromagnetic transmission apparatus.

2. Description of Related Art Including Information Disclosed Under 37 CFR 1.97 and 37 CFR 1.98.

The transmission of electromagnetic signals and electromagnetic energy can be roughly categorized as wired transmission and wireless transmission. Wired transmission uses all kinds of transmission line as transmission media, such as a coaxial cable or a waveguide. Even though wired transmission exhibits high transmission efficiency, both ends of the transmission line have to be connected to a transmitter and a receiver, and it requires additional space to arrange the transmission line. Both requirements make wired transmission an inconvenience approach. Therefore, most of the current consumer electronic devices utilize wireless transmission.

Unlike wired transmission, wireless transmission does not need a transmission line, and therefore it is a more convenient and versatile approach. However, due to the fact that wireless transmission uses an antenna to transmit and receive electromagnetic waves, and that a typical small-sized antenna broadcasts electromagnetic waves to be transmitted to the air in omni-direction, the antenna at the receiver can only receive a portion of the transmitted electromagnetic power while most of the transmitted electromagnetic power are scattered in the air.

Another wireless transmission is the point to point near-field coupling. Point to point near-field coupling requires electromagnetic coupling elements at the transmitter and the receiver. The electromagnetic coupling element at the transmitter has to be in a certain range and position relative to the electromagnetic coupling element at the receiver for the electromagnetic signals and electromagnetic energy to be transmitted. The examples of point to point near-field coupling applications include photo transmission for digital cameras and electric toothbrush charging. Point to point near-field coupling transmission does not need a transmission line and has exhibits very high transmission efficiency when the transmission distance is relatively short. However, the position alignment of coupling elements requirement limits the transmission range of electromagnetic signal and energy.

U.S. Pat. No. 6,959,450B1 discloses a device for non-contact transmission of electrical signals and/or energy between two parts mobile relative to each other. Such device is suitable for semi-fixed structure, such as shaft or slide rail. Each part of the device is constituted of a plurality of coupling devices connected to a conductor segment or structure. Electromagnetic energy is fed into the segment or the structure, and the end terminal of the device is connected to a load to reduce the energy reflection from the signal fed terminal.

U.S. Pat. No. 6,856,788B2 discloses a wireless IC connection method and system. The capacitance coupler of the transceiver of the system couples electromagnetic energy to a waveguide structure, such as a micro-strip line or coplanar waveguide transmission line, and the electromagnetic energy propagates along the waveguide structure to achieve the objective of electromagnetic energy transmission. This system uses termination resistors at each terminal to reduce the signal reflection.

This system also uses capacitance couplers at a specific location of the waveguide structure as the feed points of electromagnetic energy.

Areisteidis Karalis et al. published an essay "Efficient wireless non-radiative mid-range energy transfer" in 27 Apr. 2007 disclosing a method for electromagnetic energy transmission. Such method uses two non-radiative resonance structures to achieve the objective of electromagnetic energy transmission.

One application of this disclosure provides an electromagnetic transmission apparatus, which does not need a transmission line to achieve the objective of electromagnetic energy and signal transmission.

BRIEF SUMMARY OF THE INVENTION

An electromagnetic transmission apparatus constituted with periodically arranged electromagnetic coupling elements is disclosed. Electromagnetic energy can be transmitted along the electromagnetic coupling elements. An electromagnetic coupling device on a mobile or fixed device near the electromagnetic transmission apparatus within an electromagnetic distance can perform electromagnetic energy and signal transmission with the electromagnetic transmission apparatus. Accordingly, a point-to-point, a point-to-multiple-point and multiple-point-to-multiple-point electromagnetic energy and signal transmission can be performed.

One embodiment discloses an electromagnetic transmission apparatus, comprising a plurality of electromagnetic coupling elements, wherein each electromagnetic coupling element comprises at least one resonant structure, each electromagnetic coupling element is connected to an adjacent electromagnetic coupling element in a DC open-circuit manner, and each electromagnetic coupling element overlaps with an adjacent electromagnetic coupling element to form a coupling area. The plurality of electromagnetic coupling elements are arranged that when the electromagnetic transmission apparatus is operated within a specific frequency band, an electromagnetic coupling device near the electromagnetic transmission apparatus within an electromagnetic distance is electromagnetically coupled with the electromagnetic transmission apparatus by near-field coupling, and the electromagnetically coupling electromagnetic wave propagates along with the arrangement direction of the plurality of electromagnetic coupling elements.

Another embodiment discloses an electromagnetic transmission apparatus, comprising a plurality of electromagnetic coupling elements, wherein each electromagnetic coupling element comprises at least one resonant structure, each electromagnetic coupling element is connected to an adjacent electromagnetic coupling element in a DC open-circuit manner, and each electromagnetic coupling element overlaps with an adjacent electromagnetic coupling element to form a coupling area. The plurality of electromagnetic coupling elements are arranged that when the electromagnetic transmission apparatus is operated within a specific frequency band, the electromagnetic wave of an electromagnetic coupling device near the electromagnetic transmission apparatus within an electromagnetic distance propagates to another electromagnetic coupling device near the electromagnetic transmission apparatus within the electromagnetic distance by near-field coupling.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the application.

DETAILED DESCRIPTION OF THE INVENTION

Figure 1:
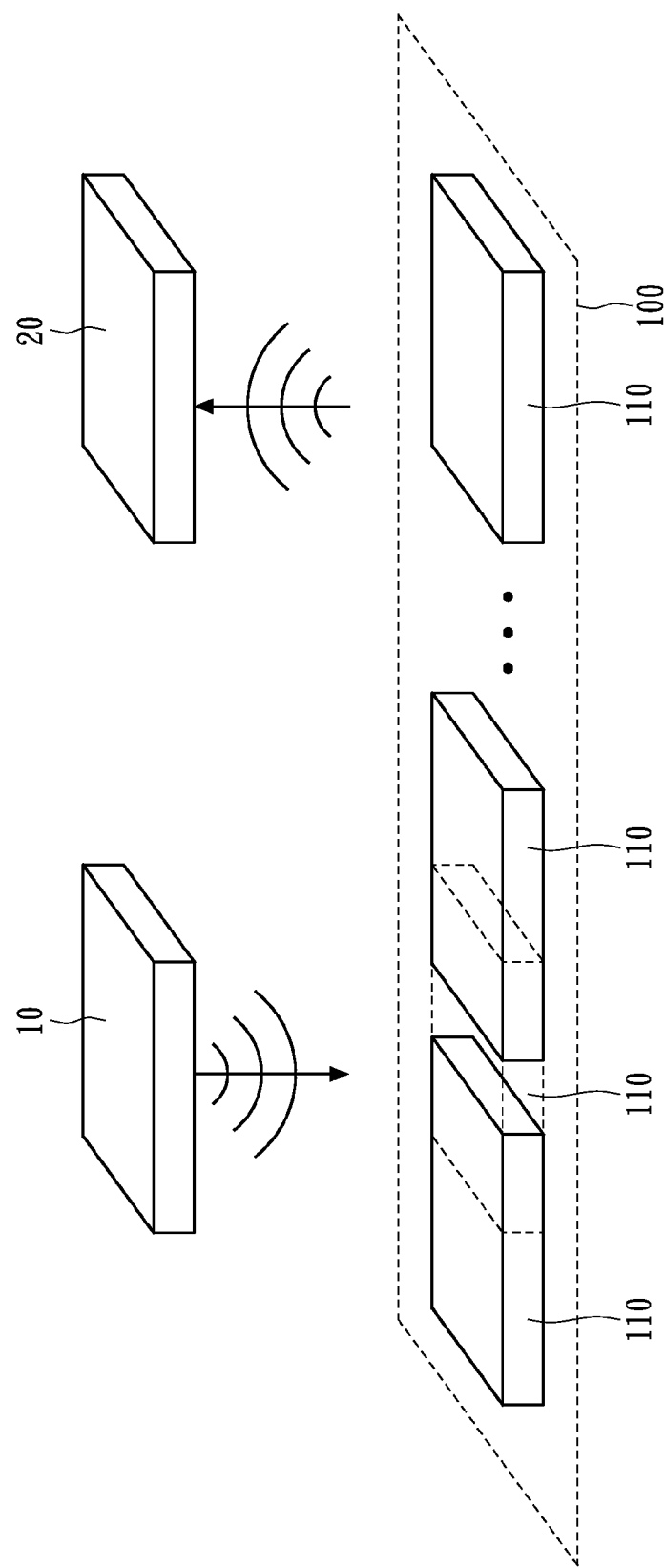
FIG. 1 illustrates the block diagram of an electromagnetic transmission apparatus in accordance with an exemplary embodiment.

FIG. 1 illustrates the block diagram of an electromagnetic transmission apparatus in accordance with an exemplary embodiment. As shown in FIG. 1, the electromagnetic transmission apparatus 100 comprises a plurality of electromagnetic coupling elements 110. Each of the electromagnetic coupling elements 110 comprises at least one resonant structure, i.e. resonator, to generate electromagnetic near-field energy distribution. Each electromagnetic coupling element 100 is connected to an adjacent electromagnetic coupling element 100 in a direct-current open-circuit manner (DC open), and each electromagnetic coupling element 100 partially overlaps with an adjacent electromagnetic coupling element 100 to form a coupling area. In some embodiments of the this disclosure, the partially overlap of two electromagnetic coupling elements 100 indicates that the projection area in normal direction of one electromagnetic coupling element 100 overlaps with that of another electromagnetic coupling element 100. The plurality of electromagnetic coupling elements 110 are arranged that when the electromagnetic transmission apparatus 100 is operated within a specific frequency band, electromagnetic energy and signals can propagate along the electromagnetic transmission apparatus 100 in a near-field manner. As shown in FIG. 1, an electromagnetic coupling device 10 performs electromagnetic energy or signal transmission with another electromagnetic coupling device 20. For instance, the electromagnetic coupling device 10 can be used to charge the electromagnetic coupling device 20, or the electromagnetic coupling device 10 can transmit electromagnetic signals to the electromagnetic coupling device 20. The electromagnetic coupling devices 10 and 20 can be connected to a transceiver, a radio frequency identification (RFID) tag or a charging module.

When the electromagnetic transmission apparatus 100 is operated within a specific frequency band, an electromagnetic coupling device near the electromagnetic transmission apparatus 100 within an electromagnetic distance is electromagnetically coupled with the electromagnetic transmission apparatus 100 by near-field coupling. Electromagnetic energy and signals can also be fed to or retrieve from the electromagnetic transmission apparatus 100 through a transmission line connected to a conductor part of the electromagnetic transmission apparatus 100. Accordingly, if the electromagnetic coupling devices 10 and 20 are within an electromagnetic distance with the electromagnetic transmission apparatus 100, the electromagnetic coupling devices 10 and 20 can perform electromagnetic energy and signals transmission with each other through the electromagnetic transmission apparatus 100. Preferably, the electromagnetic distance is shorter than one fifth of the wavelength of the specific frequency band, and the distance between the electromagnetic coupling devices 10 and 20 is longer than one tenth of the wavelength of the specific frequency band.

In addition to coupling with the electromagnetic coupling devices 10 and 20, the electromagnetic transmission apparatus 100 can also be connected to a transceiver, an RFID tag or a charging module via a transmission line. Accordingly, the electromagnetic coupling devices 10 and 20 can perform electromagnetic energy and signals transmission with an electronic device physically connected to the electromagnetic transmission apparatus 100.

Figure 2:
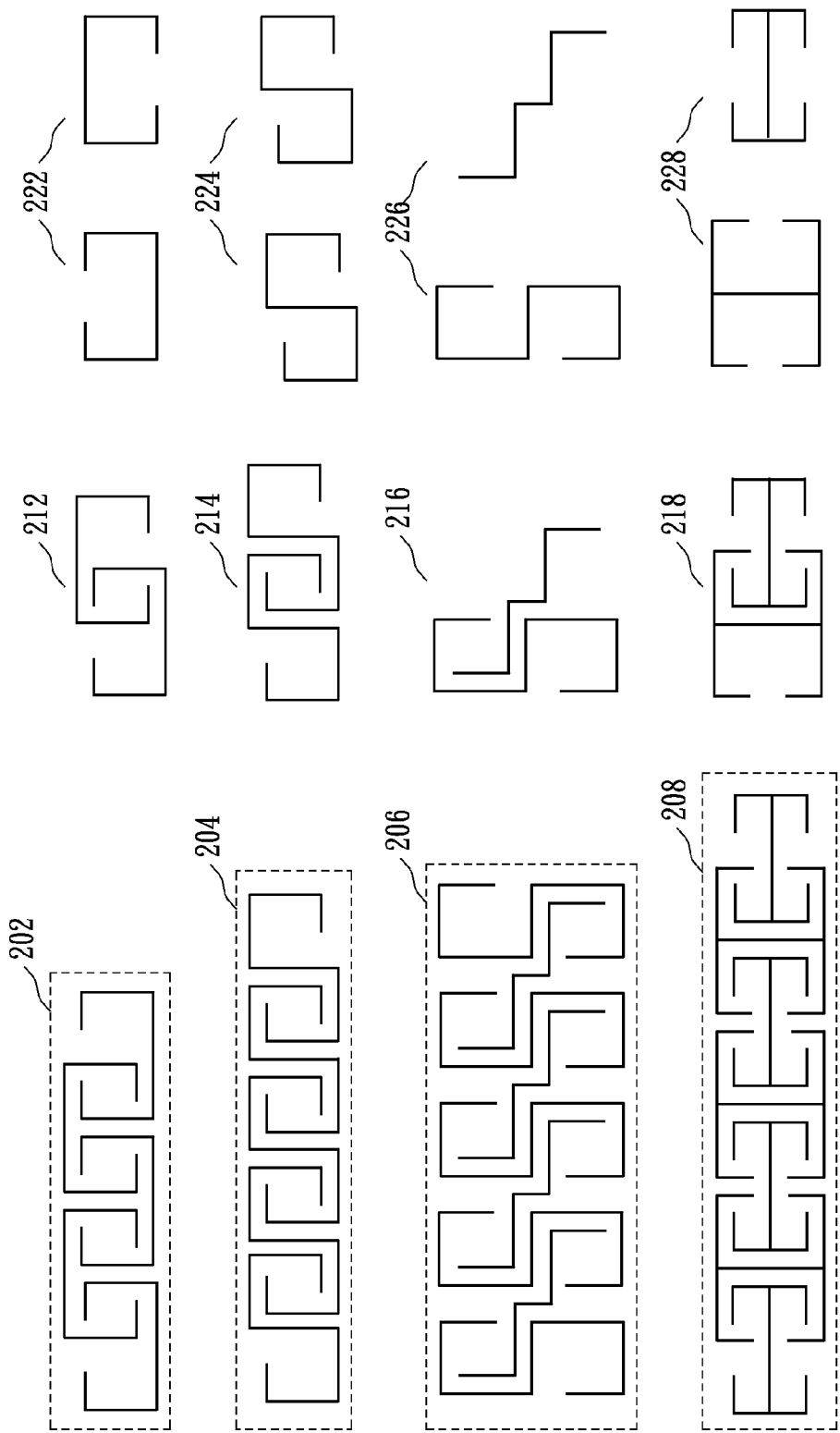
FIG. 2 illustrates a plurality of electromagnetic coupling elements in accordance with some exemplary embodiments.

FIG. 2 illustrates a plurality of electromagnetic coupling elements in accordance with some exemplary embodiments. As shown in FIG. 2, each of the electromagnetic transmission apparatuses 202 to 208 is composed of a plurality of electromagnetic coupling elements 212 to 218, i.e. the electromagnetic transmission apparatus 202 is composed of a plurality of electromagnetic coupling elements 212, the electromagnetic transmission apparatus 204 is composed of a plurality of electromagnetic coupling elements 214, and so on. Each of the electromagnetic coupling elements 212 to 218 is composed of at least one resonator 222 to 228, i.e. the electromagnetic coupling element 212 is composed of at least one resonator 222, and the electromagnetic coupling element 214 is composed of at least one resonator 224, and so on. These resonators 222 to 228 can be the same shape or with different shapes. FIG. 2 shows the resonators 222 with C-shape, resonators 224 with S-shape, resonators 226 with S-shape and step-shape and resonators 228 with different sizes of H-shape. The combinations of the resonators 222 to 228 constitute the electromagnetic coupling elements 212 to 218. Each of the electromagnetic coupling elements 212 to 218 overlaps with an adjacent electromagnetic coupling element to form a coupling area. The coupling area enhances the electromagnetic energy coupling of the adjacent electromagnetic coupling elements such that the electromagnetic energy can propagate along the electromagnetic transmission apparatuses 202 to 208.

Since the electromagnetic transmission apparatuses of the exemplary embodiments of this disclosure are constituted by a plurality of electromagnetic coupling elements, the lengths of these electromagnetic transmission apparatuses can be adjusted by inserting or removing one or more such electromagnetic coupling elements. In addition, the orientation of the arrangement of these electromagnetic transmission apparatuses can be adjusted by designs. Therefore, the electromagnetic transmission apparatuses of the exemplary embodiments of this disclosure can cover a significant coupling range by disposing these electromagnetic transmission apparatuses on plane or curvature planes.

Figure 3A:
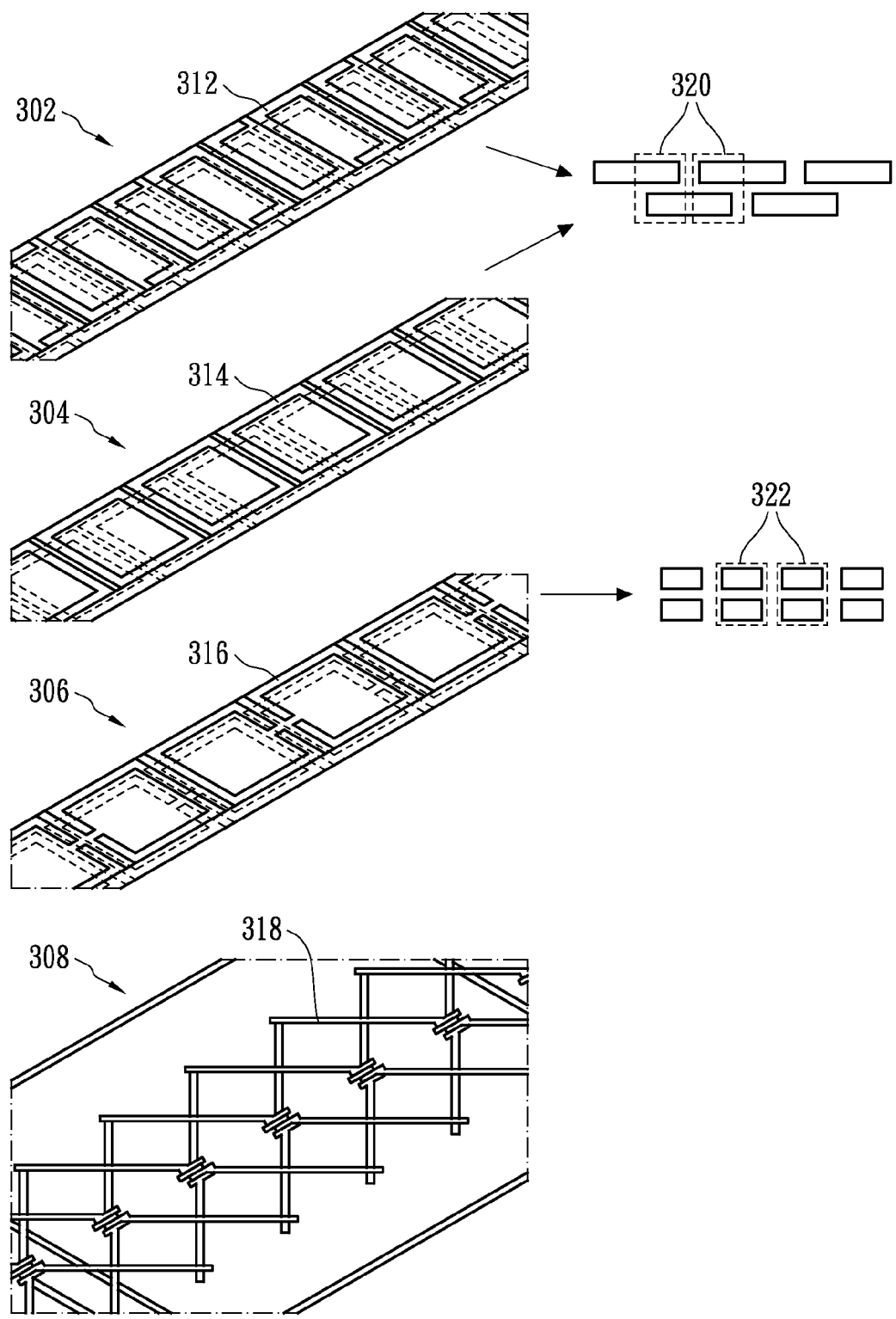
FIGS. 3A and 3B illustrate a plurality of electromagnetic transmission apparatuses disposing on a two-layered structure in accordance with some exemplary embodiments.

FIG. 3A illustrates a plurality of electromagnetic transmission apparatuses disposing on a two-layered structure in accordance with some exemplary embodiments. As shown in FIG. 3A, each of the electromagnetic transmission apparatuses 302 to 308 is composed of a plurality of electromagnetic coupling elements. All electromagnetic coupling elements in each group of the plurality of electromagnetic coupling elements corresponding to an electromagnetic transmission apparatus are disposed on a layered dielectric material. The plurality of electromagnetic coupling elements are respectively composed of the S-shaped resonators 312, the O-shaped resonators 314, the C-shaped resonators 316 (two C-shaped resonators 316 constitute an electromagnetic coupling element) and the double T-shaped resonators 318. The resonators in each group of the plurality of resonators 312 to 318 are disposed on each of the upper side and lower side of a two-layered dielectric structure. As shown in the cross-sectional views indicated by the arrows in FIG. 3A, each of the electromagnetic coupling elements constituted by these resonators 312 to 318 vertically overlaps with another resonator. In other words, an electromagnetic coupling element on the upper side of a two-layered dielectric structure, e.g. resonators 312 to 316, vertically overlaps with another electromagnetic coupling element on the lower side of the two-layered dielectric structure to form the coupling areas 320 and 322. The coupling areas 322 are constituted by complete overlaps of the resonators. The coupling areas 320 are constituted by partial overlaps of the resonators.

Figure 3B:
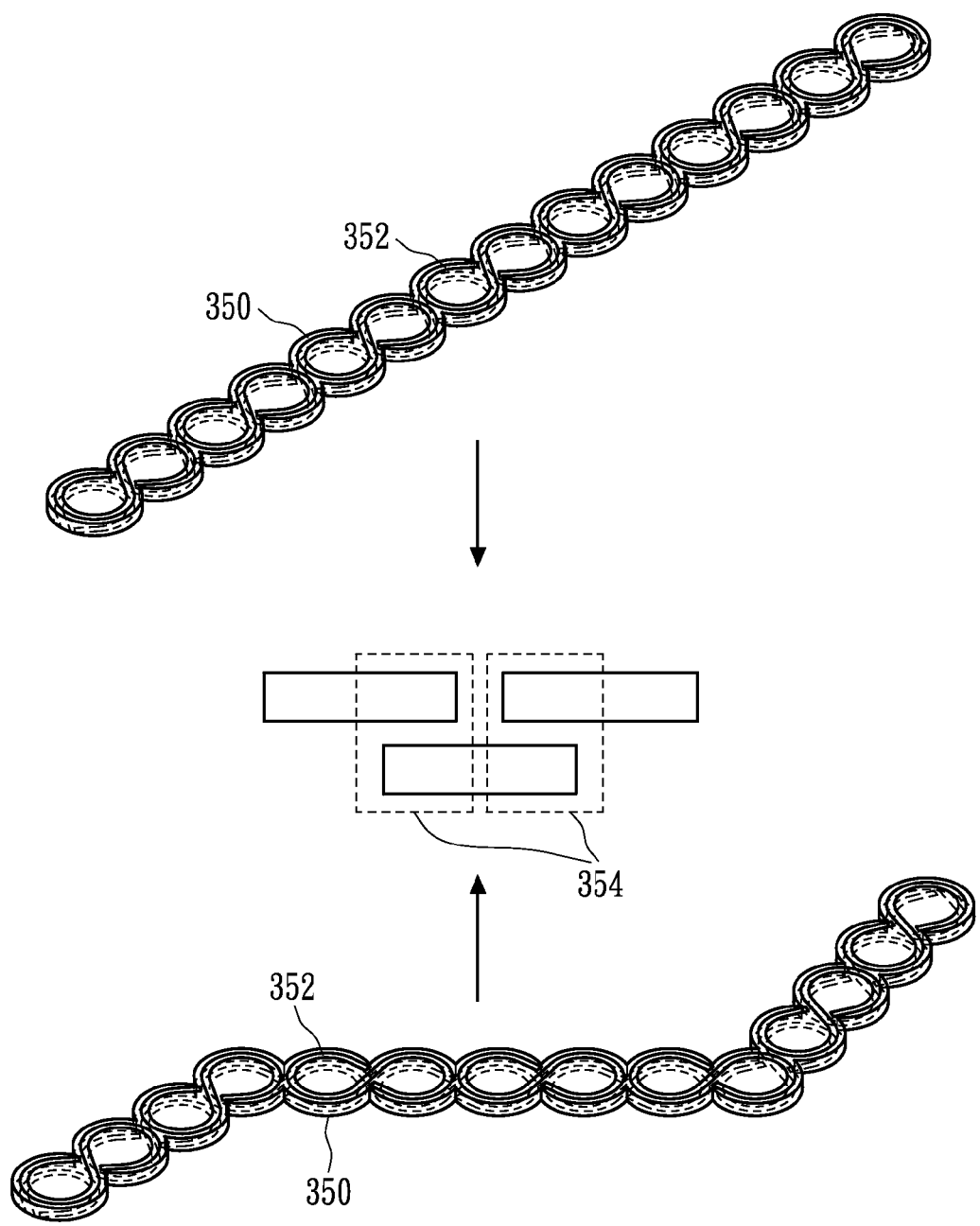
Figure 3C:
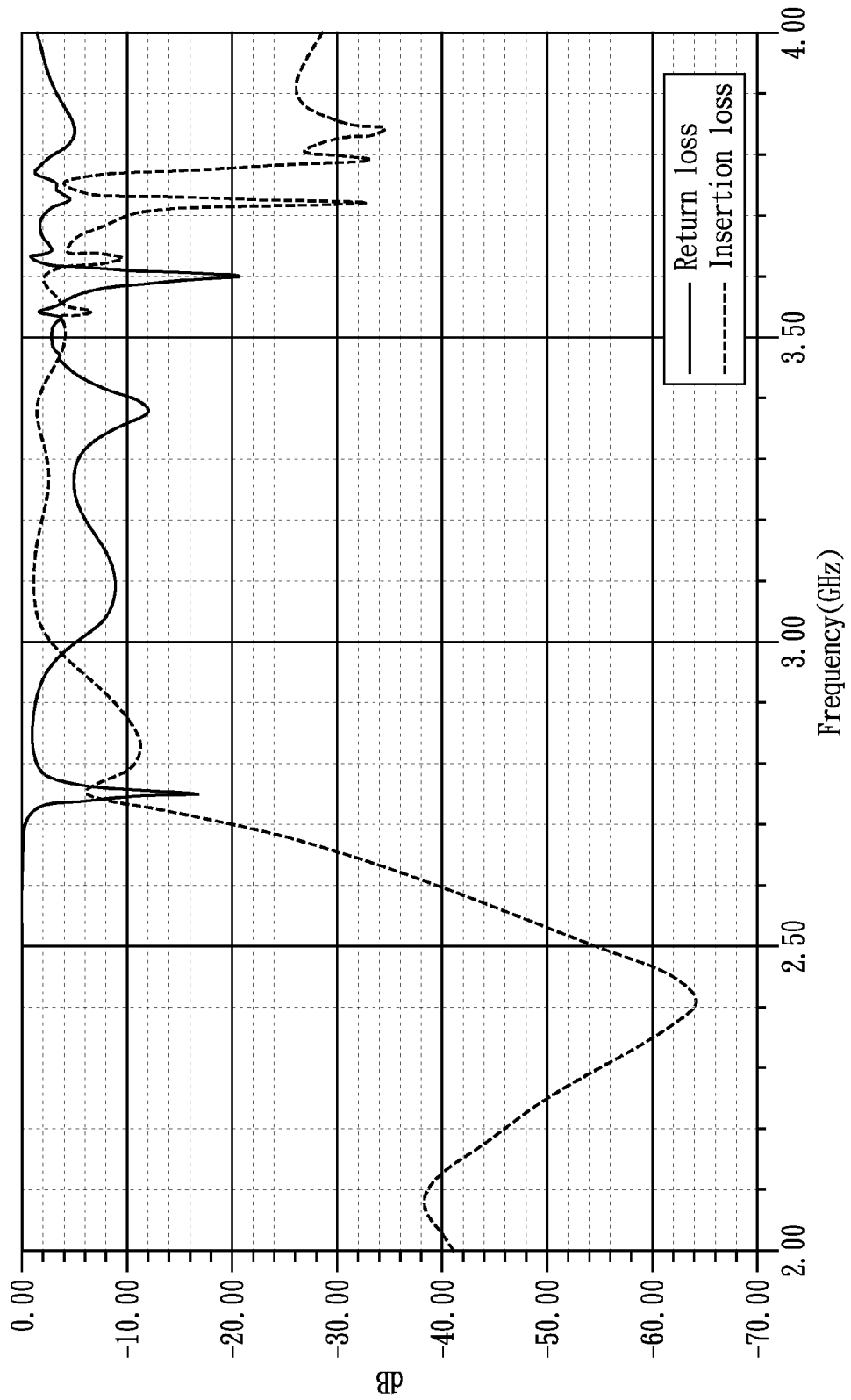
FIGS. 3C and 3D show the transmission characteristic of a plurality of electromagnetic transmission apparatuses in accordance with some exemplary embodiments.

FIG. 3B illustrates a plurality of electromagnetic transmission apparatuses disposing on a two-layered structure in accordance with some other exemplary embodiments. As shown in FIG. 3B, the electromagnetic transmission apparatus 350 is composed of a plurality of S-shaped resonators 352. The plurality of S-shaped resonators 352 are disposed on each of the upper side and lower side of a layered dielectric structure. As shown in the cross-sectional view indicated by the arrows in FIG. 3B, a plurality of coupling areas 354 are constituted by the partially overlapped S-shaped resonators 352. It should be noted that due to the structure of the plurality of S-shaped resonators 352, the electromagnetic transmission apparatus 350 is bendable. As shown in FIG. 3B, the outline of the electromagnetic transmission apparatus 350 is adjustable. FIG. 3C shows the transmission characteristic of the electromagnetic transmission apparatus 302.

The distance between the center of an S-shaped resonator 312 to the center of another S-shaped resonator 312 is 8.1 millimeters. As shown in FIG. 3C, the insertion loss of the electromagnetic transmission apparatus 302 is about 2 dB.

Figure 3D:
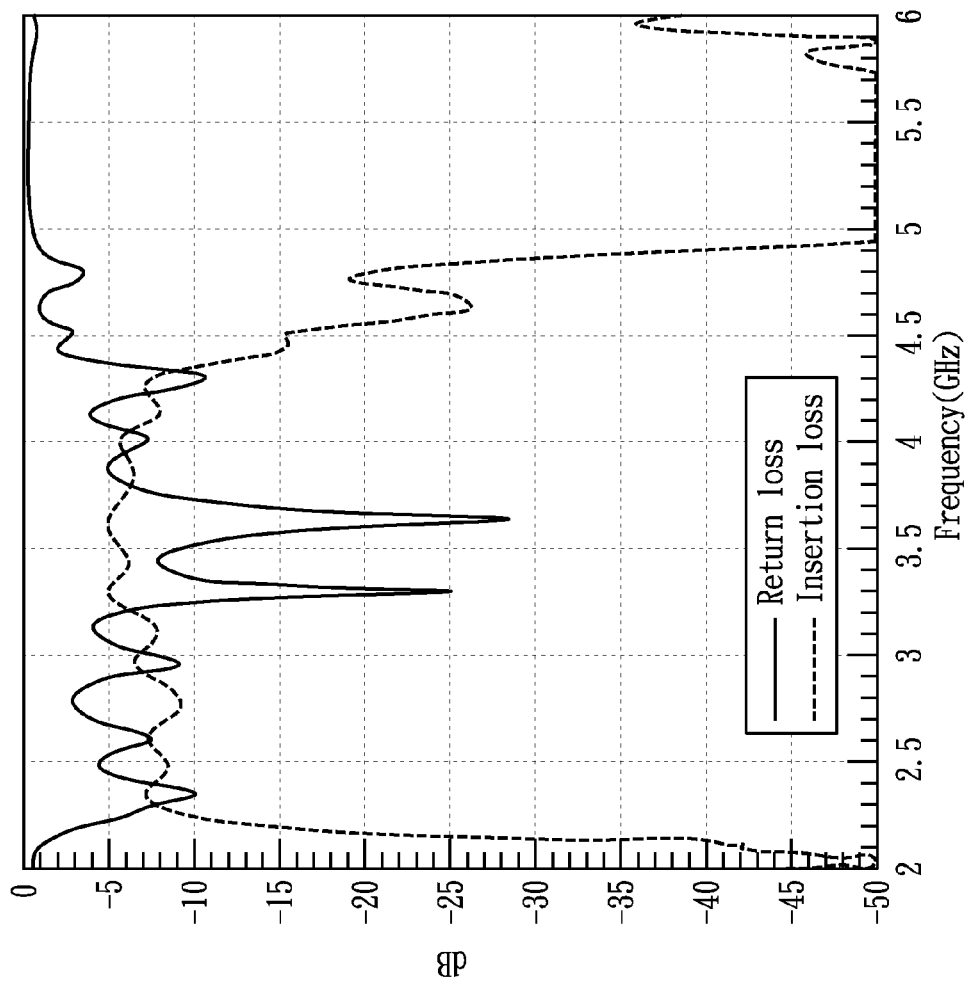

FIG. 3D shows the transmission characteristic of the electromagnetic transmission apparatus 350. The distance between the center of an S-shaped resonator 352 to the center of another S-shaped resonator 352 is 19.2 millimeters. As shown in FIG. 3D, the minimum transmission loss of the electromagnetic transmission apparatus 350 is about 4 dB. Under the same distance, the minimum transmission loss between two electromagnetic transmission devices is about 35 dB. In principle, the electromagnetic transmission apparatuses 302 and 350 improve the transmission loss.

Figure 4:
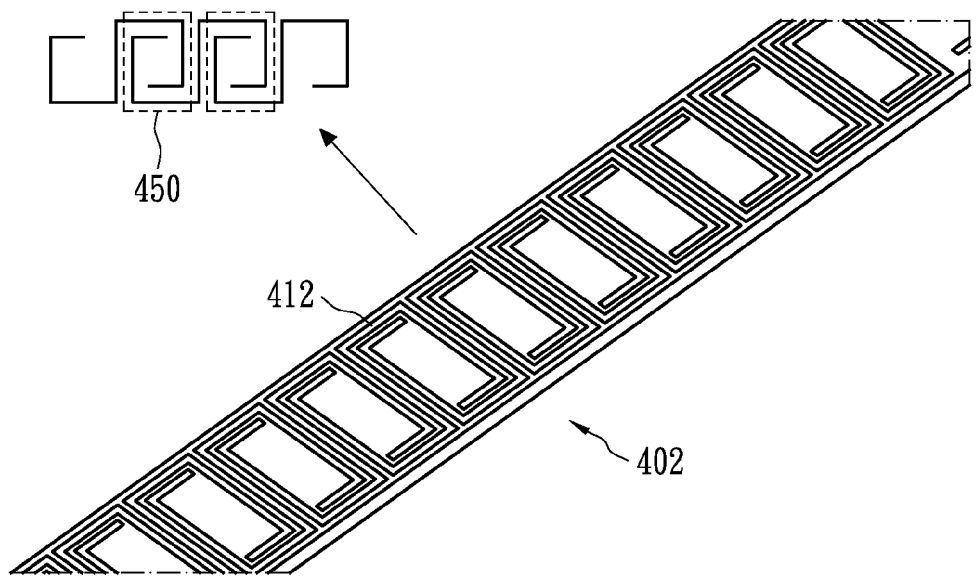
FIG. 4 illustrates the a plurality of electromagnetic coupling elements disposing on a one-layered structure in accordance with some exemplary embodiments.
Figure 4:
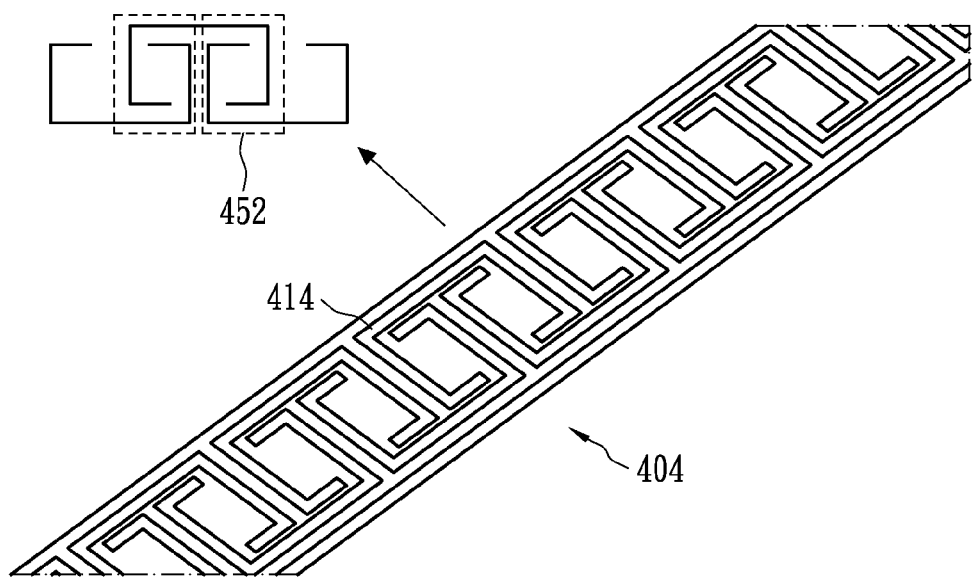

FIG. 4 illustrates a plurality of electromagnetic transmission apparatuses disposing on a one-layered structure in accordance with some exemplary embodiments. As shown in FIG. 4, the electromagnetic transmission apparatuses 402 and 404 are composed of a plurality of electromagnetic coupling elements respectively, and both are disposed on a layered dielectric material. The electromagnetic coupling elements are composed of the S-shaped resonators 412 or the C-shaped resonators 414. The resonators 412 and 414 partially overlap with each other in the horizontal direction to form the coupling areas 450 and 452. The arrangements are shown in FIG. 4 as indicated by the arrows. The electromagnetic coupling elements shown in FIGS. 3 and 4 can be formed on the layered dielectric materials by printing or etching techniques. In addition, the operation frequencies of these electromagnetic transmission apparatuses are relating to the dielectric coefficients of the layer dielectric substrates, which therefore may be taken into consideration when designing these electromagnetic transmission apparatuses. Preferably, these layered dielectric materials are bendable such that the electromagnetic transmission apparatuses can be disposed on a curvature to improve the practicability of these electromagnetic transmission apparatuses.

FIGS. 3A to 3D and 4 illustrate a plurality of electromagnetic transmission apparatuses disposing on layered dielectric materials in accordance with some exemplary embodiments. However, the electromagnetic transmission apparatuses of this disclosure are not limited to being disposed on a one-layered or two-layered structure, but can also be applied to other arrangements not departing from the spirit of this disclosure. In addition, the dielectric coefficients of different layers of the layered dielectric materials can be different or the same.

Figure 5:
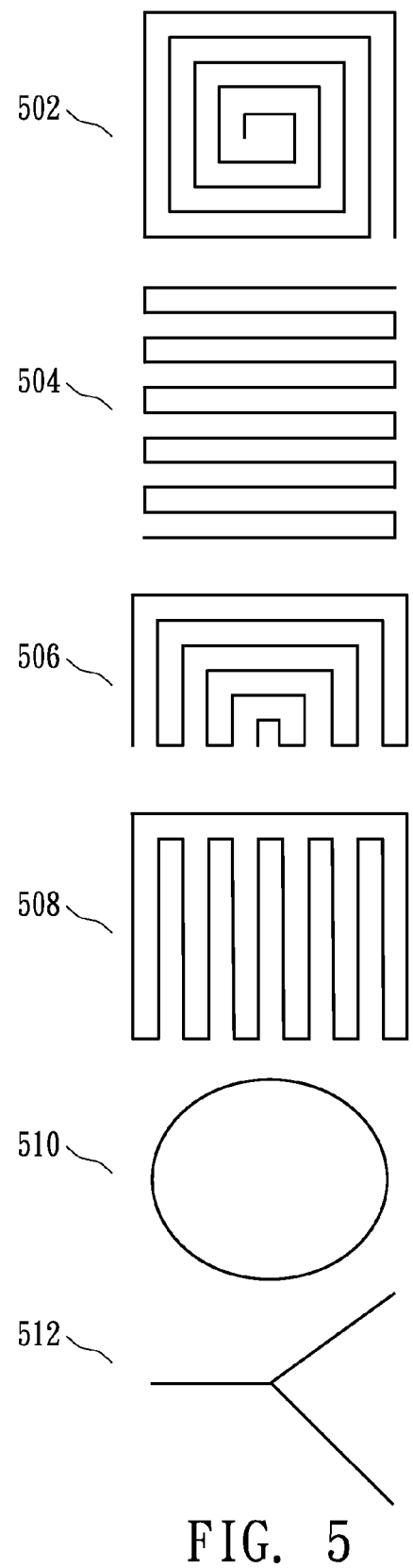
FIG. 5 illustrates the arrangements of a plurality of electromagnetic transmission apparatuses in accordance with some exemplary embodiments.

FIG. 5 illustrates the arrangements of a plurality of electromagnetic transmission apparatuses in accordance with some exemplary embodiments (the layered dielectric substrate is not shown).

As shown in FIG. 5, both ends of each of the electromagnetic transmission apparatuses 502 to 506 are not connected such that an open loop is formed. Accordingly, each of the electromagnetic coupling elements at each end of the open loop constitutes one coupling areas, and each of the remaining electromagnetic coupling elements constitutes two coupling areas. On the other hand, both of the electromagnetic transmission apparatuses 508 and 510 are arranged to form a close loop. Accordingly, each electromagnetic coupling element constitutes two coupling areas. The electromagnetic transmission apparatus 512 is arranged in a branched manner and forms an open loop. However, the electromagnetic transmission apparatuses of this disclosure are not limited to the aforementioned arrangement, but can also be applied to other arrangements not departing from the spirit of this disclosure. In some exemplary embodiments, the electromagnetic transmission apparatuses 502 to 508 apply the arrangement shown in FIG. 3B such that the electromagnetic transmission apparatuses 502 to 508 are bendable.

Figure 6:
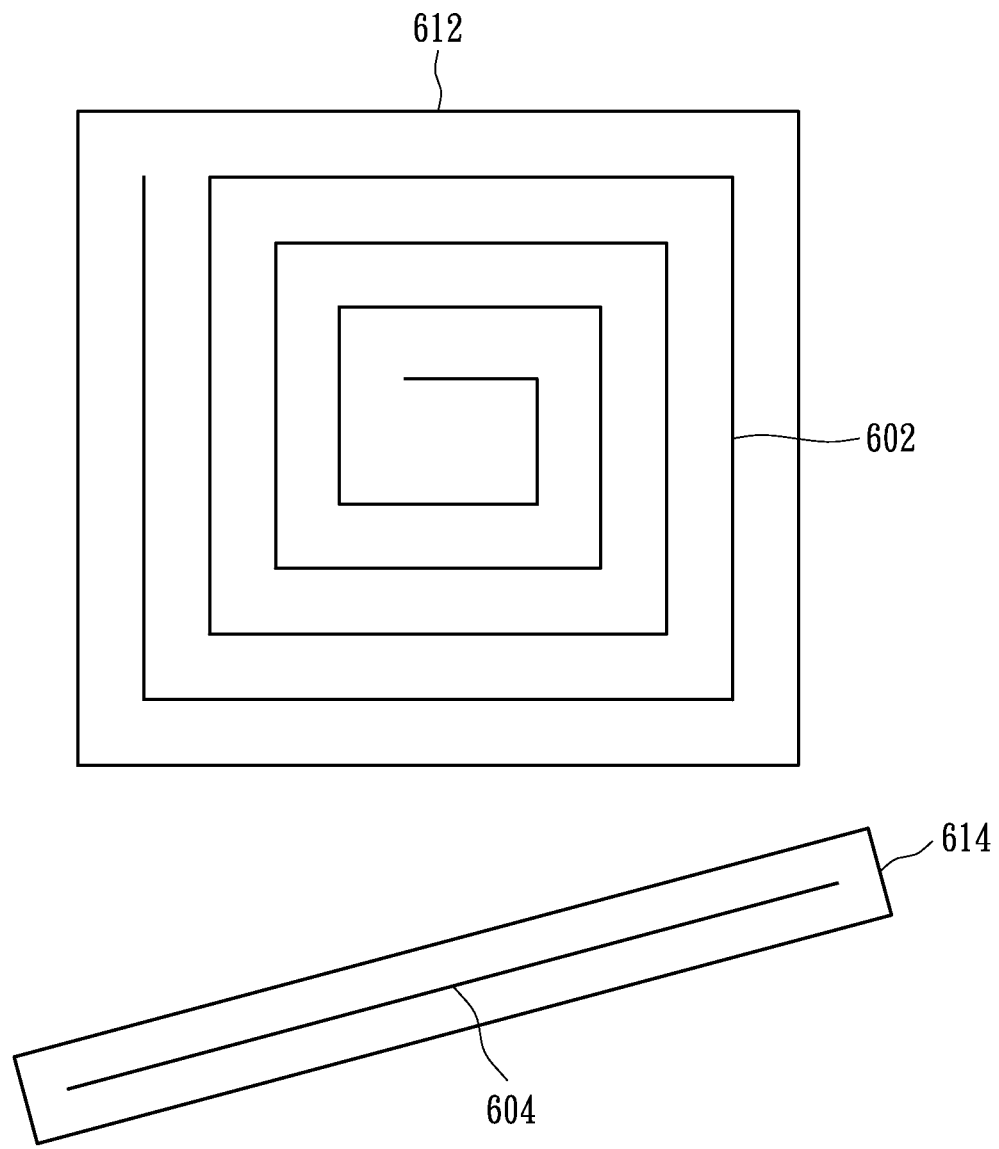
FIG. 6 illustrates the arrangements of a plurality of electromagnetic transmission apparatuses in accordance with some other exemplary embodiments.

FIG. 6 illustrates the arrangements of a plurality of electromagnetic transmission apparatuses in accordance with some other exemplary embodiments. As shown in FIG. 6, the electromagnetic transmission apparatus 602 is disposed on a layered dielectric material 612 with plate shape along the surface of the layered dielectric material 612. The layered dielectric material 612 can be a single-layered dielectric material or a multiple-layered dielectric material. Any electromagnetic coupling device placed on the layered dielectric material 612 can perform electromagnetic coupling with another electromagnetic coupling device placed on the layered dielectric material 612. The electromagnetic transmission apparatus 604 is disposed along the direction of the layered dielectric material 614. Therefore, the electromagnetic transmission apparatus 602 can be set up on a table such that users can place electromagnetic coupling device on the electromagnetic transmission apparatus 602 freely. The electromagnetic transmission apparatus 604 acts as a tape such that it can be stored or stuck on other objects. The electromagnetic transmission apparatus 602 can be constituted by a plurality of the electromagnetic transmission apparatuses 604.

Figure 7:
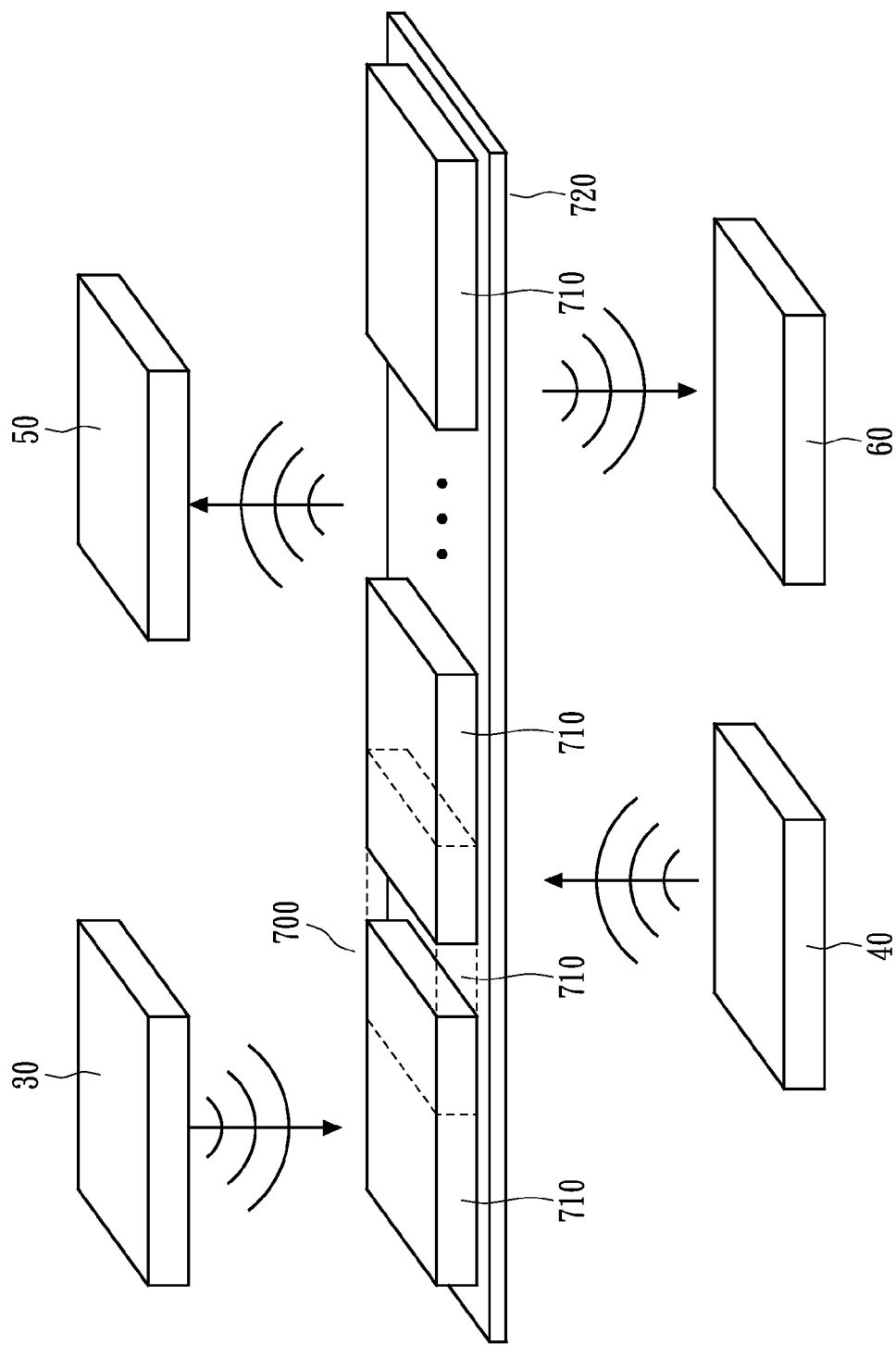
FIG. 7 illustrates the block diagram of an electromagnetic transmission apparatus in accordance with another exemplary embodiment.

FIG. 7 illustrates the block diagram of an electromagnetic transmission apparatus in accordance with another exemplary embodiment. As shown in FIG. 7, the electromagnetic transmission apparatus 700 is constituted by a plurality of electromagnetic coupling elements 710.

The plurality of electromagnetic coupling elements 710 are disposed on a layered dielectric material 720, and each of two adjacent electromagnetic coupling elements 710 are arranged in a DC open circuit manner. As shown in FIG. 7, when the electromagnetic transmission apparatus is operated within a specific frequency band, the electromagnetic coupling devices 30 and 40 can feed electromagnetic signals to the electromagnetic transmission apparatus 700. The electromagnetic coupling devices 50 and 60 can retrieve electromagnetic signals from the electromagnetic transmission apparatus 700. Accordingly, a multiple-point-to-multiple-point electromagnetic energy and signal transmission can be performed. Since the electromagnetic coupling devices 30 to 60 use the electromagnetic transmission apparatus 700 to perform electromagnetic transmission by near-field coupling, the distance between each electromagnetic coupling devices has little effect on the transmission loss. In principle, the electromagnetic transmission efficiency of the electromagnetic coupling device 50 which is close to the electromagnetic coupling device 30 is not far from the electromagnetic transmission efficiency of the electromagnetic coupling device 60 which is further away from the electromagnetic coupling device 30.

Figure 8:
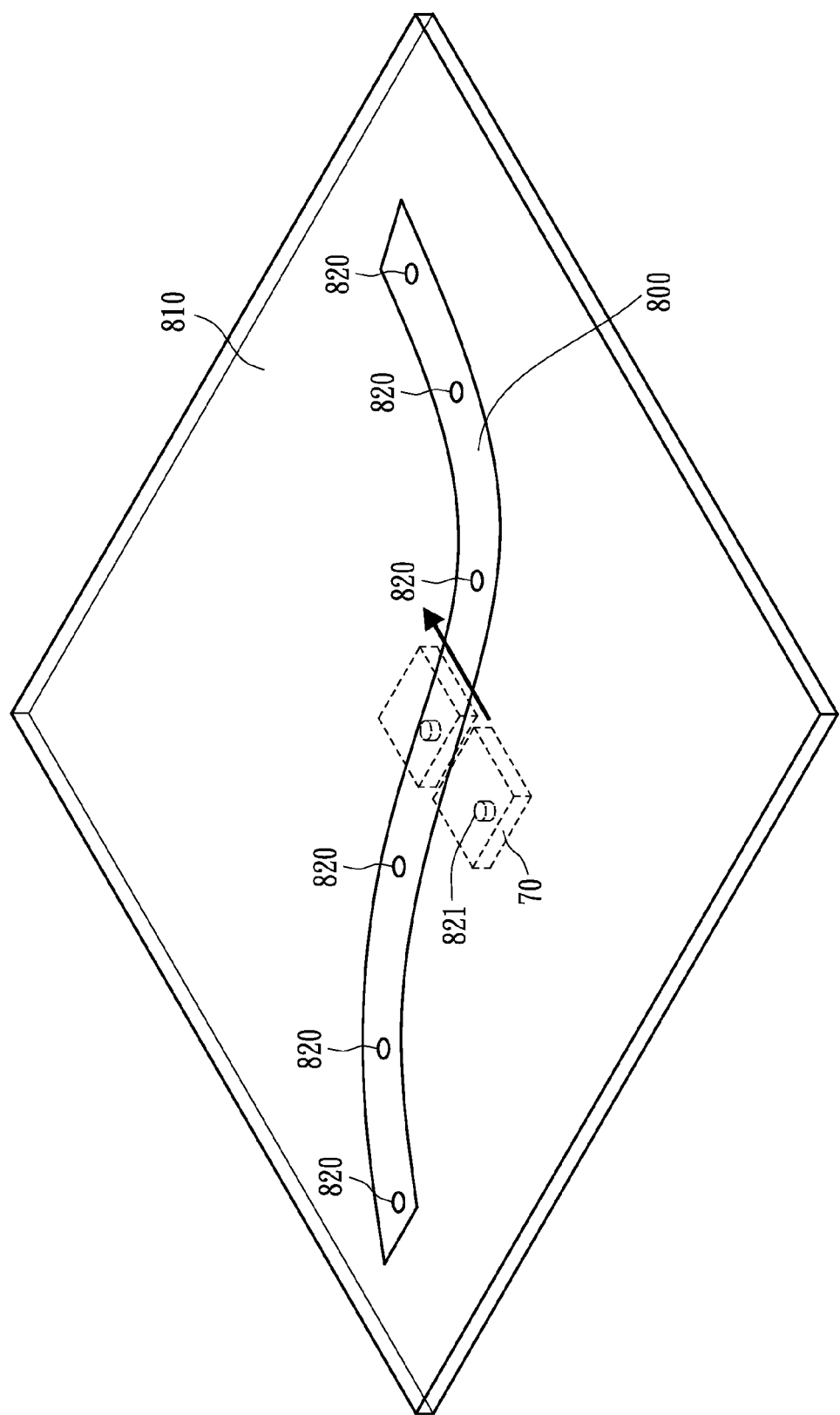
FIG. 8 illustrates the block diagram of an electromagnetic transmission apparatus in accordance with another exemplary embodiment.

FIG. 8 illustrates the block diagram of an electromagnetic transmission apparatus in accordance with another exemplary embodiment. As shown in FIG. 8, the electromagnetic transmission apparatus 800 is disposed on a plate 810. An electromagnetic coupling device 70 is desired to perform electromagnetic coupling with the electromagnetic transmission apparatus 800. Both the electromagnetic transmission apparatus 800 and the electromagnetic coupling device 70 comprise electromagnetic materials 820 and 821. Accordingly, due to the magnetic force between the electromagnetic material 820 and 821, the electromagnetic coupling device 70 will slide to the electromagnetic transmission apparatus 800 and be aligned with the electromagnetic transmission apparatus 800 as indicated by arrow in FIG. 8.

In conclusion, the electromagnetic transmission apparatuses of this disclosure utilize the periodically arranged electromagnetic coupling elements to achieve the objective of performing electromagnetic energy and signal transmission by near-field coupling. The lengths of the electromagnetic transmission apparatuses of this disclosure can be adjusted by inserting or removing the electromagnetic coupling elements to or from the electromagnetic transmission apparatuses. The arrangement and orientation of the electromagnetic transmission apparatuses of this disclosure can be altered such that a vast coupling range can be achieved on a surface or a curvature plane.

Accordingly, the alignment requirement in traditional electromagnetic transmission, e.g. point-to-point electromagnetic transmission, can be met and the user-convenience can be greatly improved. In addition, the electromagnetic transmission apparatuses of this disclosure utilize near-filed coupling such that the electromagnetic wave will propagate along the electromagnetic transmission apparatuses.

An electromagnetic transmission apparatus constituted with periodically arranged electromagnetic coupling elements is disclosed. Electromagnetic energy can be transmitted along the electromagnetic coupling elements. An electromagnetic coupling device on a mobile or fixed device near the electromagnetic transmission apparatus within an electromagnetic distance can perform electromagnetic energy and signal transmission with the electromagnetic transmission apparatus. Accordingly, a point-to-point, a point-to-multiple-point and multiple-point-to-multiple-point electromagnetic energy and signal transmission can be performed.

The above-described exemplary embodiments are intended to be illustrative only. Those skilled in the art may devise numerous alternative embodiments without departing from the scope of the following claims.

We claim:

1. An electromagnetic transmission apparatus, comprising:
a plurality of electromagnetic coupling elements, wherein each electromagnetic coupling element comprises at least one resonant structure, each electromagnetic coupling element is connected to an adjacent electromagnetic coupling element in a direct-current open-circuit manner, and each electromagnetic coupling element overlaps with an adjacent electromagnetic coupling element to form a coupling area;
wherein the plurality of electromagnetic coupling elements are arranged that when the electromagnetic transmission apparatus is operated within a specific frequency band, an electromagnetic coupling device near the electromagnetic transmission apparatus within an electromagnetic distance is electromagnetically coupled with the electromagnetic transmission apparatus by near-field coupling, and the electromagnetic wave of the electromagnetically coupling propagates along with the arrangement direction of the plurality of electromagnetic coupling elements.

2. The electromagnetic transmission apparatus of claim 1, wherein the plurality of electromagnetic coupling elements are disposed on a layered dielectric material.

3. The electromagnetic transmission apparatus of claim 2, wherein the plurality of electromagnetic coupling elements are disposed on the same side of a layered dielectric material.

4. The electromagnetic transmission apparatus of claim 2, wherein the plurality of electromagnetic coupling elements are disposed on different sides of a layered dielectric material.

5. The electromagnetic transmission apparatus of claim 2, wherein the layered dielectric material is in a plate shape, and the plurality of electromagnetic coupling elements are disposed on the layered dielectric material along the surface of the layered dielectric material.

6. The electromagnetic transmission apparatus of claim 2, wherein the layered dielectric material is in a stripe shape, and the plurality of electromagnetic coupling elements are disposed on the layered dielectric along the direction of the layered dielectric material.

7. The electromagnetic transmission apparatus of claim 2, wherein the layered dielectric material is a bendable material such that the plurality of electromagnetic coupling elements are disposed on a curvature surface.

8. The electromagnetic transmission apparatus of claim 1, wherein the plurality of electromagnetic coupling elements form a close loop, and each electromagnetic coupling element constitutes at least two coupling areas.

9. The electromagnetic transmission apparatus of claim 1, wherein the plurality of electromagnetic coupling elements form an open loop, each of the electromagnetic coupling elements at each end of the open loop constitutes at least one coupling areas, and each of the remaining electromagnetic coupling elements constitutes at least two coupling areas.

10. The electromagnetic transmission apparatus of claim 1, wherein the electromagnetic distance is shorter than one fifth of the wavelength of the specific frequency band.

11. The electromagnetic transmission apparatus of claim 1, wherein the electromagnetic coupling device is connected to a transceiver, a radio frequency identification tag or a charging module.

12. The electromagnetic transmission apparatus of claim 1, further comprising:
    at least a magnetic material device, which is attractable to an electromagnetic coupling device with a magnetic material device.

13. The electromagnetic transmission apparatus of claim 1, further comprising:
    a conductor part, which is configured to be connected to a transmission line for a direct energy feeding or energy retrieving.

14. An electromagnetic transmission apparatus, comprising:
    a plurality of electromagnetic coupling elements, wherein each electromagnetic coupling element comprises at least one resonant structure, each electromagnetic coupling element is connected to an adjacent electromagnetic coupling element in a direct-current open-circuit manner, and each electromagnetic coupling element overlaps with an adjacent electromagnetic coupling element to form a coupling area;
    wherein the plurality of electromagnetic coupling elements are arranged that when the electromagnetic transmission apparatus is operated within a specific frequency band, the electromagnetic wave of an electromagnetic coupling device near the electromagnetic transmission apparatus within an electromagnetic distance propagates to another electromagnetic coupling device near the electromagnetic transmission apparatus within the electromagnetic distance by near-field coupling.

15. The electromagnetic transmission apparatus of claim 14, wherein the plurality of electromagnetic coupling elements are disposed on a layered dielectric material.

16. The electromagnetic transmission apparatus of claim 15, wherein the plurality of electromagnetic coupling elements are disposed on the same side of a layered dielectric material.

17. The electromagnetic transmission apparatus of claim 15, wherein the plurality of electromagnetic coupling elements are disposed on different sides of a layered dielectric material.

18. The electromagnetic transmission apparatus of claim 15, wherein the layered dielectric material is in a plate shape, and the plurality of electromagnetic coupling elements are disposed on the layered dielectric material along the direction of the layered dielectric material.

19. The electromagnetic transmission apparatus of claim 15, wherein the layered dielectric material is in a stripe shape, and the plurality of electromagnetic coupling elements are disposed on the layered dielectric material along the direction of the layered dielectric material.

20. The electromagnetic transmission apparatus of claim 15, wherein the layered dielectric material is a bendable material such that the plurality of electromagnetic coupling elements are disposed on a curvature surface.

21. The electromagnetic transmission apparatus of claim 14, wherein the plurality of electromagnetic coupling elements form a close loop, and each electromagnetic coupling element constitutes at least two coupling areas.

22. The electromagnetic transmission apparatus of claim 14, wherein the plurality of electromagnetic coupling elements form an open loop, each of the electromagnetic coupling elements at each end of the open loop constitutes at least one coupling areas, and each of the remaining electromagnetic coupling elements constitutes at least two coupling areas.

23. The electromagnetic transmission apparatus of claim 14, wherein the electromagnetic distance is shorter than one fifth of the wavelength of the specific frequency band.

24. The electromagnetic transmission apparatus of claim 14, wherein the distance between the electromagnetic coupling devices is longer than one tenth of the wavelength of the specific frequency band.

25. The electromagnetic transmission apparatus of claim 14, wherein each of the electromagnetic coupling devices is connected to a transceiver, a radio frequency identification tag or a charging module.

26. The electromagnetic transmission apparatus of claim 14, further comprising:
    at least a magnetic material device, which is attractable to an electromagnetic coupling device with a magnetic material device.

27. The electromagnetic transmission apparatus of claim 14, further comprising:
    a conductor part, which is configured to be connected to a transmission line for a direct energy feeding or energy retrieving.

* * * * *